(12) United States Patent
Štebe

(10) Patent No.: US 8,624,732 B2
(45) Date of Patent: Jan. 7, 2014

(54) PROVIDING ACCESS TO QUALITY INDICATORS FOR NATURAL RESOURCES

(76) Inventor: Tomaž Štebe, Menges (SI)

( * ) Notice: Subject to any disclaimer, the term of this patent is extended or adjusted under 35 U.S.C. 154(b) by 509 days.

(21) Appl. No.: 12/956,341

(22) Filed: Nov. 30, 2010

(65) Prior Publication Data

US 2012/0133508 A1 May 31, 2012

(51) Int. Cl.
*G08B 21/00* (2006.01)

(52) U.S. Cl.
USPC ........... 340/540; 340/500; 340/505; 436/125; 702/127

(58) Field of Classification Search
USPC ............ 340/540, 500, 505; 436/125; 702/127
See application file for complete search history.

(56) References Cited

U.S. PATENT DOCUMENTS

| | | | | |
|---|---|---|---|---|
| 4,830,757 A * | 5/1989 | Lynch et al. | | 210/742 |
| 6,560,543 B2 * | 5/2003 | Wolfe et al. | | 702/22 |
| 6,753,186 B2 * | 6/2004 | Moskoff | | 436/125 |
| 7,424,399 B2 * | 9/2008 | Kahn et al. | | 702/188 |
| 7,797,143 B2 * | 9/2010 | Belcher et al. | | 703/9 |
| 2002/0043969 A1 * | 4/2002 | Duncan et al. | | 324/96 |
| 2003/0139983 A1 * | 7/2003 | Spencer et al. | | 705/28 |
| 2006/0031040 A1 * | 2/2006 | Wolfe | | 702/184 |
| 2009/0058636 A1 * | 3/2009 | Gaskill et al. | | 340/539.11 |
| 2012/0022803 A1 * | 1/2012 | Donnelly et al. | | 702/49 |

* cited by examiner

Primary Examiner — Eric M Blount
(74) Attorney, Agent, or Firm — Cooper Legal Group LLC

(57) ABSTRACT

One or more natural resources (e.g., bodies of water, volumes of air or earth, mineral deposits, or wildlife populations) may be tracked by one or more natural resource quality sensors, each of which may detect and report various natural resource quality indicators (e.g., indicators of purity, biological or chemical contaminants, physical properties, and indicators of various components of a processing facility managing the natural resource, such as a water supply system). These indicators may be reported to one or more natural resource servers, which may store the indicators and, upon request of one or more users, generate a natural resource quality report indicating the quality of various natural resources. Reports may also be generated spontaneously and delivered as an alert based upon alert criteria (e.g., upon detecting a water height in a river correlated with flooding, a natural resource server may notify users residing near the river).

24 Claims, 4 Drawing Sheets

PROVIDING ACCESS TO QUALITY INDICATORS FOR NATURAL RESOURCES

BACKGROUND

Within the field of computing, many scenarios relate to a natural resources located within and between the hydrosphere (water), geosphere/lithosphere (crust, mantle, and core), atmosphere (air), and biosphere (the living part of Earth), such as a body or quantity of water, a volume of soil or air, a food produced, a mineral deposit, a population of wildlife, or a nature preserve such as a park. Such natural resources may have naturally arisen within an environment (e.g., a naturally formed lake), may have been artificially created within an environment (e.g., naturally occurring plants existing within a manmade crop field or glasshouse/greenhouse), or may exist in a controlled facility (e.g., a naturally occurring body of water existing within a water supply system). Many computing techniques relate to automated systems configured to track, measure, and/or manage various parameters relating to such natural resources. For example, centralized and/or distributed systems may include sensors that detect quality indicators relating to a body of water, such as the volume of water, physical properties (e.g., temperature, pressure, state of matter, and flow rates and directions), chemical properties (e.g., purity, components such as minerals present in a spring, and contaminants such as pollutants), biological properties (e.g., wildlife present in a lake, or biological contaminants such as bacteria and microbes that are present in a drinking water supply system), and/or artificial properties (e.g., a unit cost associated with a natural resource that may be available for purchase).

With regard to such natural resources, properties of various management systems may also be tracked. For example, a water distribution system may comprise a complex set of processing components, and the layout, operating conditions, and functions of various components may be tracked as relating to the quality indicators of the treated water. Such systems may be centralized, distributed, and/or autonomous; e.g., various supervisory control and data acquisition (SCADA) industrial control systems may be utilized to manage and control the treatment, analysis, and distribution process applied to a volume of water delivered to users.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The tracking and reporting of quality indicators of a large and varied body of natural resources is often performed in ways that are difficult to evaluate. Additionally, such quality indicators are often not online and/or available in realtime. As a first example, a natural resource may be tracked in a proprietary database that is not widely and promptly available to the public. As a second example, the quality indicators for various natural resources may be reported in a manner that is inconsistent or difficult to compare between different natural resources, by different agencies, and/or for particular uses. For example, for a set of three analogous natural resources, the quality indicators for a first natural resource may be reported in a prosaic manner that is human-readable, but not automatically parsed; the quality indicators for a second natural resource may be reported with a first data set that is not human-readable; and the quality indicators for a third natural resource may be reported with a second data set comprising a different time scale, level of detail, and/or report semantics that are difficult to compare with the first data set. As a third example, different agencies may report quality indicators for different natural resources through different sources and/or protocols (e.g., the quality indicators for a first natural resource may be reported via email; the quality indicators for a second natural resource may be reported via instant text message; and the quality indicators for a third natural resource may be published to a website), and a comparison or aggregation of this information may be difficult to perform without the involvement of a human researcher who is proficient and knowledgeable about these sources and types of reports. As a result of these properties, it may be difficult for an ordinary individual to utilize these data sources to receive information regarding various queries, such as the locations and availability of water and the quality at the position of uses of different sources of water. The reported information may also be reported in a manner that is overly technical, complex, and/or obscure for use by ordinary individuals. The reported information may also be obsolete.

The present disclosure relates to techniques for presenting quality indicators of natural resources in a manner that promotes the accessibility, promptness, standardization and consistency, and detail and quality of such information. These techniques may improve the accessibility, understandability, and usefulness of information by the members of a population and completeness of quality indicators for institutions and businesses that may utilize the data for further processing and presentation. In accordance with the present techniques, users of the systems presented herein may be able to identify the natural resources in a particular area and a varied set of quality indicators relating thereto, such as the availability, cost, volume, and physical, chemical, and/or biological properties of various bodies of water in a region. Additionally, users of such systems may be able to compare different properties of different natural resources, and/or may be able to utilize automated processes ("agents") that may perform sophisticated analyses of the data representing the quality indicators of various natural resources for the evaluation and comparison thereof.

In view of these ends, the techniques presented herein relate to the configuration of information tracking and reporting systems regarding various natural resources. In accordance with these techniques, the various management systems for such natural resources may be characterized, holistically, as a body of natural resource quality sensors that detect and transmit various types of quality indicators regarding various natural resources, and a set of natural resource servers that accept such. The natural resource quality sensors may be distributed, centrally or locally managed, or may be configured to operate in an autonomous manner (e.g., tightly or loosely coupled or built-in natural resource), and may perform different levels of evaluation of such natural resources (e.g., a first sensor may transmit raw data for a natural resource, such as basic data about the chemical ingredients of a body of water, while a second sensor may evaluate such data and may transmit deduced information about the body of water, such as the classification of chemical components as minerals or pollutants and the fitness of the water for consumption). The natural resource quality sensors may also encode metadata relating to the quality indicators, such as a representation of the date and time of the detected quality indicator and a geocode indicating the location of the natural resource at the time of detection.

The natural resource quality sensors report such quality indicators to one or more natural resource servers, each of which may be configured to accept quality indicators from a particular set of natural resource quality sensors, including sensors configured to detect different types of natural resource quality indicators relating to a natural resource and/or configured to detect natural resource quality indicators for different natural resources. The natural resource servers therefore aggregate the information reported by the natural resource quality sensors in order to represent a comprehensive body of quality data from one or more natural resources. Such natural resource quality indicators may be stored, e.g., in a database, and additional evaluative processes on such natural resource quality indicators may be performed. Additionally, the natural resource servers are configured to respond to requests to generate a report for the natural resource quality indicators of one or more natural resources. These reports may comprise various types of data (e.g., human-readable reports, such as documents, charts, and maps, and/or data sets that may be evaluated by various processes), and may be reported promptly upon the request of a user and/or as a notification or alert that is automatically delivered to one or more monitoring users upon detecting the satisfaction of a set of one or more alert criteria regarding a particular natural resource. In this manner, quality indicators of natural resources may be traced and reported about pollutions, emissions and contaminants impacts on human health and life safe as per user location, and may be managed in an open database for ecological and carbon footprints. These techniques therefore permit individuals to investigate, evaluate through automated processes, and remain informed regarding the quality indicators of one or more natural resources in a position, shape, area, or region of interest.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
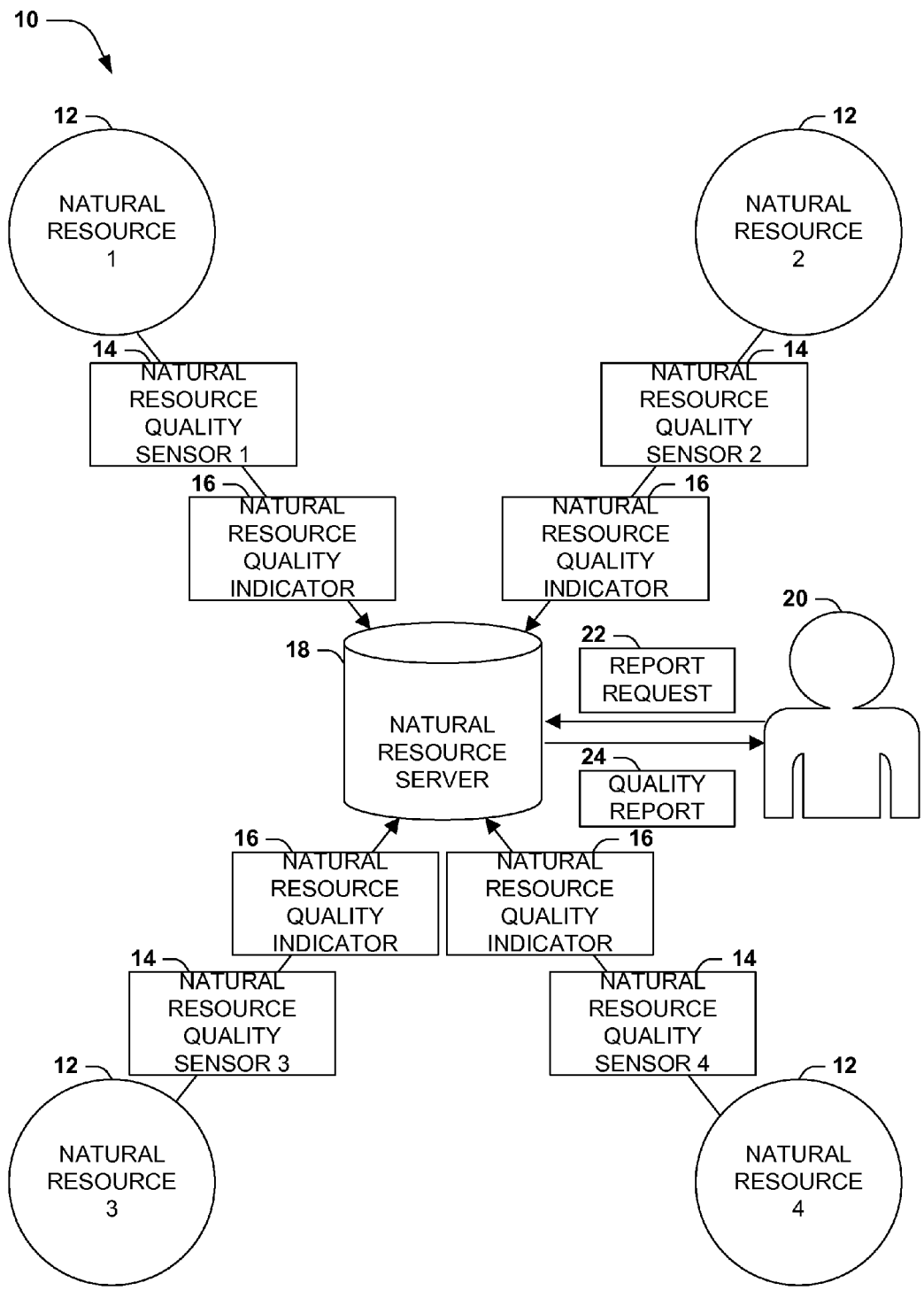
FIG. 1 is an illustration of an exemplary scenario featuring an exemplary system for presenting to users natural resource quality indicators of respective natural resources.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

This patent application is related to Slovenian patent application no. P-201000141, entitled "System and method for geocoded contents preparation from a plurality of location base elements for geoaware services information computing," filed on May 7, 2010, which is incorporated by reference as if fully rewritten herein.

Within the field of computing, many scenarios relate to the tracking, identification, and reporting of one or more natural resources. Such natural resources are often inanimate, such as a body or quantity of water, a volume of soil, rock, or air, or a mineral deposit, but may also be living, such as a population of one or more animals or plants. These natural resources may also arise naturally in an unmanaged condition (e.g., a naturally forming lake or river, an area of earth not inhabited by humans, or a wildlife population); may have been artificially created or managed within a natural environment (e.g., a manmade lake, a river managed by a dam or other control mechanism, or a wildlife population in a nature preserve or park); or may exist in a controlled facility (e.g., a volume of water stored in a reservoir or water tower and distributed through the water network, a volume of air around industrial sites or heavy traffic zones, or maintained by a climate control system within a building, or a wildlife population maintained in a zoological preserve).

In relation to such natural resources, one or more location-based systems may be devised to track various qualities, impacts, and dangers of the natural resource. As a first example, a body of water (such as an area of an ocean, river, lake, pond, or stream) may be tracked to identify various contaminants of a chemical or biological nature that may affect the suitability of the water for drinking, hygiene, cleaning, swimming, or fishing. Alternatively or additionally, various physical properties of the body of water may be tracked, such as quantity, temperature, state of matter (e.g., water, steam, or various forms of ice or snow), pressure, and flow rate and direction, which may be used to manage the body of water through various automated or human control systems. Such water tracking systems may be utilized, e.g., by a water treatment and distribution facility that is devised to provide a clean water supply for a population. As a second example, a volume of air may be monitored to detect various quantities and compositions of pollutants, e.g., from smokestacks operated by various industrial factories, in order to assess the effect on the environment, the health of individuals located in the area, or compliance with industrial regulations. As a third example, a sensor network may be configured to monitor a managed population of wildlife, such as deer in a nature preserve or fish in a body of water, and may report relevant factors such as number, location, size, health, and behavioral habits. Additional types of quality indicators may relate to abstract properties of the natural resource (e.g., a unit price assigned to a particular resource available for sale to the public, or a subjective taste evaluation of the water of a natural spring). Such types of quality indicators, relating to the quality of the natural resource, may be detected by one or more sensors of the tracking system (e.g., a chemical or biological sensor immersed in a body of water; an air sampling device positioned within an airflow location of a volume of air; or a radiofrequency identification (RFID) tracking system configured to receive information from tracking tags attached to wildlife that indicate the location and health of the wildlife), or may be reported by humans.

The quality indicators collected by various sensors may be of value to various individuals. In particular, a population of a state may wish to examine the quality indicators detected in relation to various local natural resources in order to utilize such natural resources in daily life (e.g., for determining where to obtain water for drinking and hygiene; for determining the composition and contaminants of soil on which to grow crops; and for determining the composition and health effects of air in a particular region in order to select a residence). Indeed, in view of the ubiquity, sophistication, and affordability of automated systems in the modern information age, the tracking and reporting of quality indicators of natural resources used by a population might be considered a basic human right to be offered and protected by a government. These quality indicators may also be useful for industrial agents (e.g., an industrial operation may wish to monitor the availability and quality of natural resources utilized in a manufacturing process to protect the integrity of the manufactured goods, and/or to monitor the effects of the industrial operation on the availability and composition of the natural resource), academic agents (e.g., environmentalists may use the quality indicators of various resources to study historic changes of a natural resource, or the ecological relationships and effects of various natural resources), and regulatory agents (e.g., an environmental regulatory agency may seek to monitor the overall quality of a large set of natural resources in order to choose regulatory policies that promote preservation, sustainability, and renewability). In addition to reading or studying such quality indicators for personal use, individuals may also apply various data evaluation techniques to such natural resource indicators, e.g., in order to evaluate a large number of quality indicators and/or to extrapolate other data or information that may be of use.

However, various complexities and competing interests of tracking systems may obstruct an individual from receiving, using, and comparing the natural resource quality indicators of one or more natural resources. As a first example, a tracking agency may only collect some natural resource indicators for local use, and may not report such quality indicators to the general public. Alternatively, the natural resource indicators may be exposed to the public through inefficient communication channels, e.g., as a printed text that is available on a limited basis at a particular location (such as a library). As a second example, a tracking agency may report quality indicators in a format that is difficult for an individual to use, such as in a proprietary or overly technical format that the individual may not understand or a natural-language narrative that the individual may have difficulty evaluating through automated techniques. As a third example, a tracking agency may report quality indicators for multiple natural resources and/or at various time points along a time continuum, but the types of quality indicators reported by a tracking agency between natural resources and/or time points may vary, e.g., in format, detail (such as the reporting period or breakdown of quality indicators into components), and type of reported information, such that comparisons of the quality indicators between natural resources and/or time points may be undependable or difficult. As a fourth example, different tracking agencies may report quality indicators for different natural resources or different types of natural resources in different ways, thereby obstructing a comparison of such natural resource quality indicators for different natural resources. Such difficulties may be intentional (e.g., a state or industry with a poor track record for pollution control may seek to discourage comparisons of utilized natural resources with those of states or industries with good track records for pollution control) or unintentional (e.g., an unintended incompatibility in formats of data comprising quality indicators that are reported by different tracking agencies). As a fifth example, even if natural resource quality indicators for different natural resources are publicly available in a compatible format, such natural resource quality indicators may be available from a wide range of different providers, and an individual seeking to perform a broad survey of natural resources may have difficulty discovering, interfacing with, and receiving quality indicators from a large set of providers of natural resource quality indicators. As a sixth example, natural resource quality indicators may not be timely collected (e.g., in realtime) or reported, and/or may not be available online. For example, an agency may periodically collect water quality samples for a particular body of water, but might only be report such water quality samples as an annual, printed bulletin. As a seventh example, natural resources may be positioned at some locations, and quality indicators are to be tracked and computed as per individual position and other factors.

The present disclosure relates to techniques for improving the reporting of quality indicators of natural resources to users. These techniques relate to the characterization of the different systems involved in the collection, evaluation, and reporting of data into two groups—a set of natural resource quality sensors that are configured to collect and transmit natural resource quality indicators from one or more natural resources, and a set of natural resource servers that are configured to receive natural resource quality indicators from one or more natural resource quality sensors, to store such quality indicators, and to generate reports of natural resource quality of various natural resources to users upon request. Additionally, a natural resource server may utilize such natural resource quality indicators to track the criteria of one or more alerts, and if the quality indicators satisfy the alert criteria for an alert, may notify various users of the quality indicators (e.g., notifying individuals located in a particular area when pollution levels for a local body of water exceed a tolerable threshold). In this manner, the users may receive, from one natural resource server, a set of natural resource quality indicators (possibly of a standardized format) indicating the quality of various natural resources, may evaluate and compare such quality indicators (possibly utilizing automated processes that extrapolate further data), and may use the information represented by the quality indicators to make decisions of a personal, academic, industrial, financial, trading, and/or governmental nature.

FIG. 1 presents an exemplary scenario 10 featuring a first embodiment of these techniques. In this exemplary scenario 10, a set of natural resources 12 exists within and between Earth's spheres, such as a set of bodies of water that are to be monitored for quality to be reported to one or more users 20. Accordingly, the first embodiment of these techniques includes a set of natural resource quality sensors 14 configured to detect a set of natural resource quality indicators 16 of the natural resource 12. The first embodiment of these techniques also includes a natural resource server 18, which is devised to collect natural resource quality indicators 16 to be delivered to users 20. Accordingly, the natural resource quality sensors 14 are configured to, upon detecting a natural resource quality indicator 16 of the natural resource 12, transmit the natural resource quality indicator 16 to the natural resource server 18. Additionally, the natural resource server 18 is configured to, upon receiving a natural resource quality indicator 16, store the natural resource quality indicator 16. The natural resource server 18 is also configured to, upon receiving from a user 20 a report request 22 to report a natural resource quality of a natural resource 12, generate a natural resource quality report 24 comprising at least one natural resource quality indicator 16 of a natural resource 12 associated with the user 20, and send the natural resource quality report 24 to the user 20. In this manner, the embodiment (comprising the natural resource server 18 and the natural resource quality sensors 14) notifies various users 20 of the natural resource quality of various natural resources 12 that are pertinent to the user 20.

Figure 2:
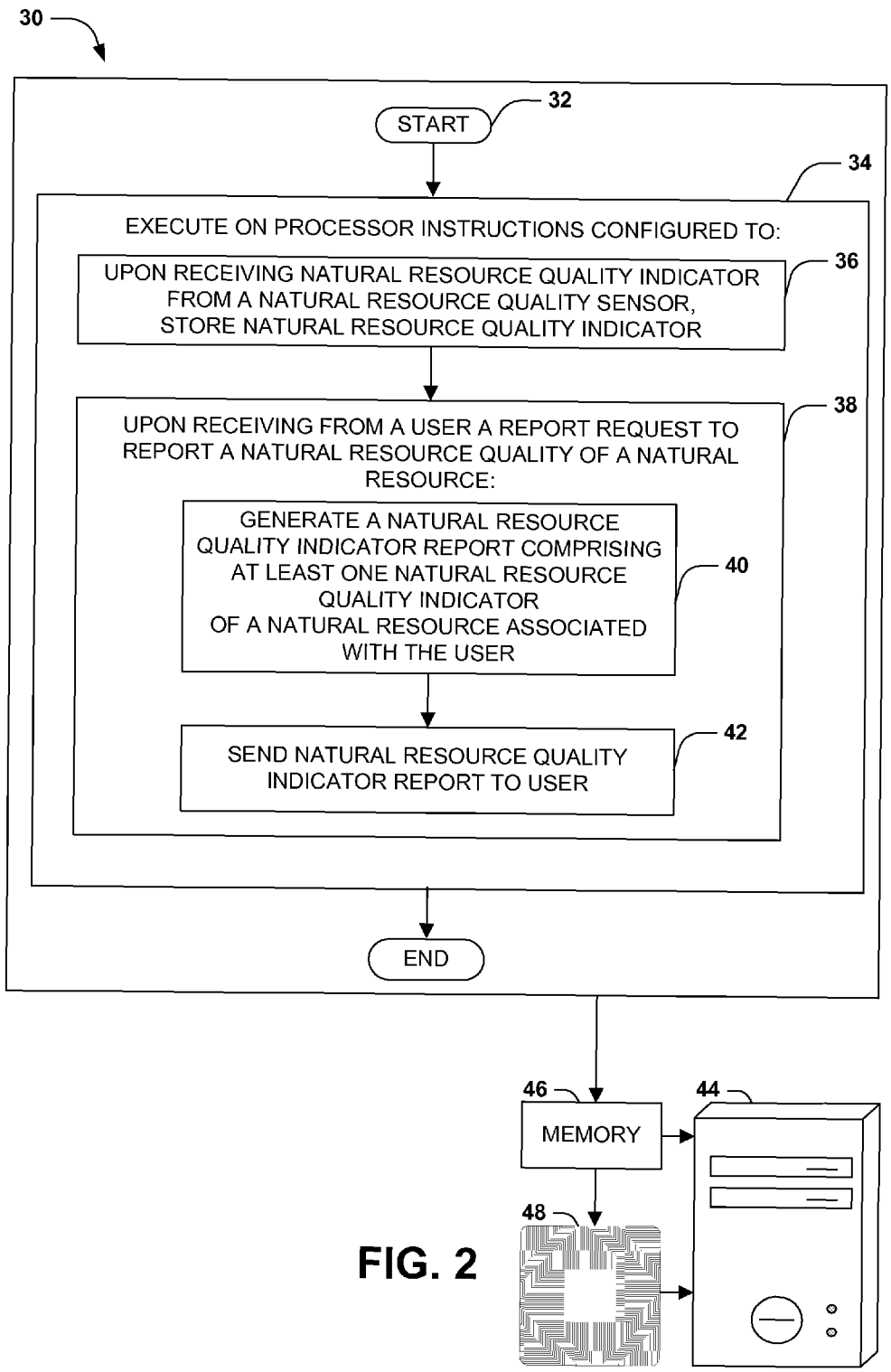
FIG. 2 is a flow chart illustrating an exemplary method of presenting to users natural resource quality indicators of respective natural resources.

FIG. 2 presents a second embodiment of these techniques, depicted as an exemplary method 30 of presenting to users 20 natural resource quality indicators 16 of respective natural resources 12 using a computer 44 having a processor 48. The exemplary method 30 may be implemented, e.g., as a set of instructions stored on a volatile or nonvolatile memory component 46 of the computer 44 (e.g., system memory, a hard drive, a solid state storage component, or a magnetic or optical disc), and configured for execution on the processor 48. The exemplary method 30 begins at 32 and involves executing 34 on the processor 48 instructions configured to perform the techniques presented herein. In particular, the instructions are configured to, upon receiving a natural resource quality indicator 16 from a natural resource quality sensor 14, store 36 the natural resource quality indicator 16 (e.g., in the memory component 46 of the computer 44). The instructions are also configured to, upon receiving 38 from a user 20 a report request 22 to report a natural resource quality of a natural resource 12, generate a natural resource quality report 24 comprising at least one natural resource quality indicator 16 of at least one natural resource 12 associated with the user 20, and send the natural resource quality report 24 to the user 20. In this manner, the exemplary method 30 of FIG. 2 collects natural resource quality indicators 16 for various natural resources 12 and generates corresponding reports to be delivered to users 20 about natural resources 12 pertinent to the user 20. Additional elements of this exemplary method 30 may involve, e.g., storing, archiving, and/or managing collected and processed natural resource quality indicators.

Figure 3:
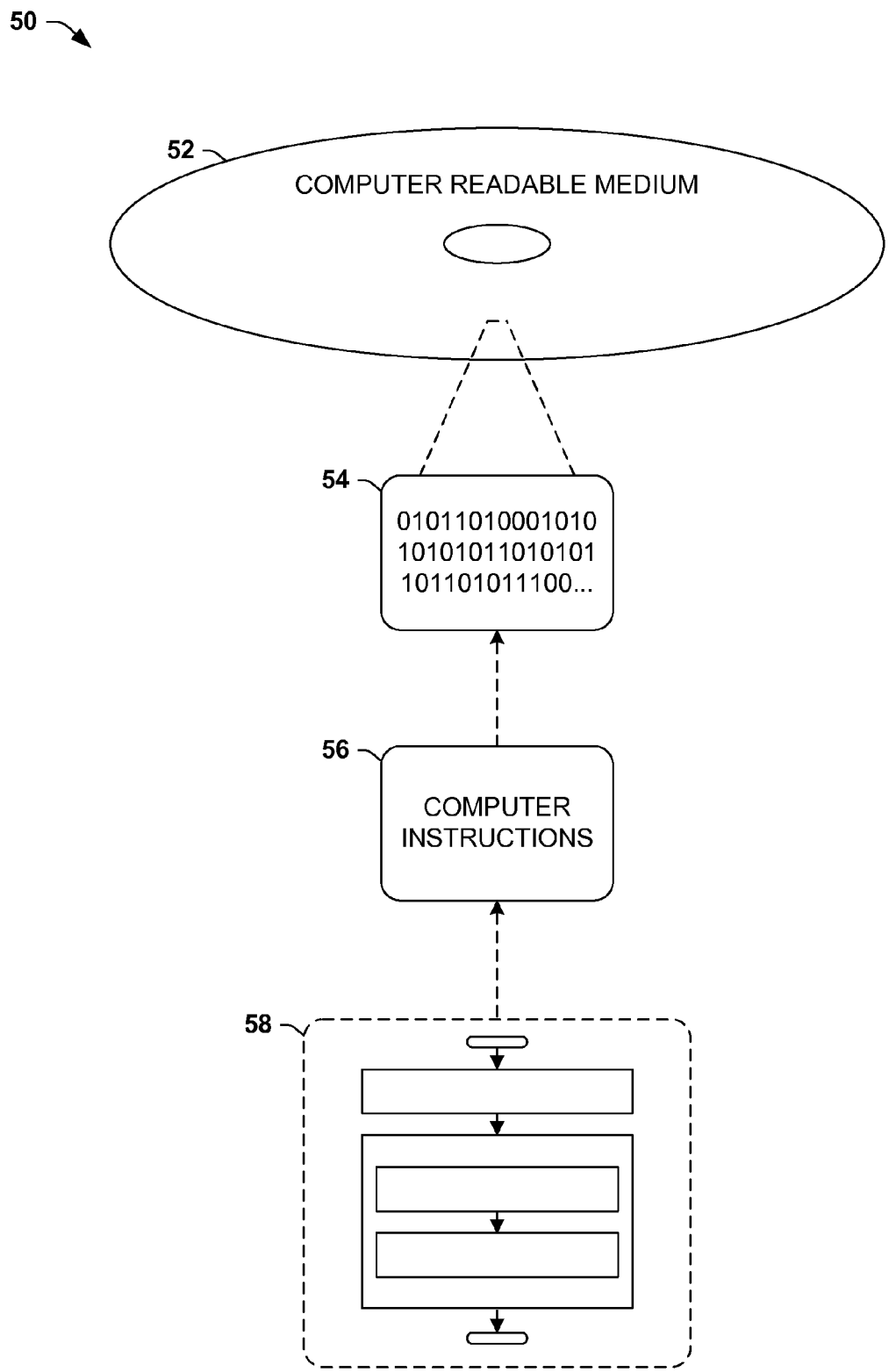
FIG. 3 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 3, wherein the implementation 50 comprises a computer-readable medium 52 (e.g., a CD-R, DVD-R, or a platter of a hard disk drive), on which is encoded computer-readable data 54. This computer-readable data 54 in turn comprises a set of computer instructions 56 configured to operate according to the principles set forth herein. In one such embodiment, the processor-executable instructions 56 may be configured to perform a method of presenting to users natural resource quality indicators of respective natural resources, such as the exemplary method 30 of FIG. 2. In another such embodiment, the processor-executable instructions 56 may be configured to implement a system for presenting to users natural resource quality indicators of respective natural resources, such as the exemplary system of FIG. 1. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 30 of FIG. 2 and the exemplary system of FIG. 1) to confer individual and/or synergistic advantages upon such embodiments.

A first aspect that may vary among embodiments of these techniques relates to the scenarios wherein such techniques may be utilized. As a first example, the techniques may be utilized to track and report quality indicators 16 for many types of natural resources 12. These natural resources may include, e.g., volumes of water, such as in a water supply system, or an ocean, river, lake, stream, or pond; a volume of air, such as the air within a defined region of a city; a volume of soil or rock; a mineral deposit; or various types of animals or plants. These natural resources may exist in an unmanaged state in the environment, such as in a naturally forming body of water; in a managed state in the environment, such as in a manmade lake; or in a controlled facility, such as a water tower or water distribution system. As a second example, the techniques may be utilized to track many types of natural resource quality indicators 16 of a natural resource 12. For instance, natural resource quality indicators 16 may be selected to indicate various natural properties of the natural resource 12, such as a natural resource type indicator (indicating a type of the natural resource 12 within a class of natural resource types), a natural resource age indicator (indicating the age of the natural resource 12) or a natural resource source indicator (indicating the origin of the natural resource 12). The natural resource quality indicators 16 may also be selected to indicate various chemical properties of the natural resource 12, such as a natural resource component indicator (indicating one or more components of the natural resource 12, such as chemicals contained within a chemical natural resource or individual entities within a biological natural resource, e.g., individual plants and animals within a wildlife preserve), a natural resource concentration indicator (indicating the concentration of particular chemical components of the natural resource 12), or a natural resource contaminant indicator (indicating the presence, types, and/or amounts of various contaminants of the chemical concentration of the natural resource 12). The natural resource quality indicators 16 may also be selected to indicate various physical properties of the natural resource 12, such as a natural resource physical dimension indicator (indicating one or more physical dimensions of the natural resource 12, such as length, width, height, mass, density, pressure, distribution, or shape), a natural resource temperature indicator (indicating a current temperature of the natural resource 12), or a natural resource quantity indicator (indicating a quantity of the natural resource 12). The natural resource quality indicators 16 may also be selected to indicate various abstract properties of the natural resource 12, such as a natural resource price indicator (indicating a unit price of a unit of the natural resource 12 that may be available for sale to users 20); a natural resource consumer indicator (indicating a consumer opinion of the natural resource 12); and a natural resource quality grade indicator (indicating a qualitative assessment of the properties of the natural resource 12).

In the particular example of a body of water, natural resource quality indicators 16 may be selected from a set of water quality indicators including a water chemical component indicator; a water biological component indicator (indicating the presence of microscopic or macroscopic organisms in the quantity of water); a water physical component indicator (indicating a physical property of the quantity of water, such as pressure or state of matter); a water purity indicator or a water contaminant indicator; a water source indicator (indicating the source of the water in the body of water); a water temperature indicator (indicating the temperature of the body of water); a water volume indicator (indicating a volumetric dimension of the body of water); a water flow rate indicator and/or a water flow direction indicator (indicating a rate and/or direction of flow of the water within another body of water, over land, or in a piping or irrigation system); and/or a water quality grade indicator (indicating the quality and suitability of the water for various uses, such as cooking, drinking, hygiene, swimming, cleaning, fishing, irrigation, and use in an industrial process). A collection of such water quality indicators may be selected to describe the body of water in significant detail, and a set of natural resource quality sensors may be selected and configured to detect such properties of the body of water for reporting to a natural resource server 18.

As a third example of this first aspect, in some scenarios, the natural resource 12 may be managed by a natural resource processing system, such as a water treatment or distribution facility, a dam or reservoir control system, a river flow monitoring system, an air cleaning or conditioning system, a soil or mineral deposit monitoring system, or a wildlife location or health tracking system. In such scenarios, various properties of one or more processing components of the natural resource processing system may be detected by various natural resource quality sensors 14 and may be reported as natural resource quality indicators 16 relating to the managed natural resource 12. For example, a water treatment plant may include many processing components that measure properties of a body of water, filter out large and small contaminants, add desired minerals such as fluoride, and distribute the water to various users 20 and other systems; and the natural resource quality indicators 16 may be selected to indicate the existence, configuration, and operating status of these processing components (e.g., the types and quantities of materials filtered out by a filtering system, the types and quantities of minerals being added, and a map of the distribution channels to various parts of a city with distribution flow rates and/or flow directions). These qualities of the natural resource processing system may be as informative and useful to users 20 as quality indicators of the natural resource 12 proper, and may therefore be reported together with such other natural resource quality indicators 16. Those of ordinary skill in the art may devise many types of natural resource quality indicators 16 that may be selected, detected by various natural resource quality sensors 14, and reported to users 20 through a natural resource server 18 according to the techniques presented herein.

A second aspect that may vary among embodiments of these techniques relates to the types and configurations of natural resource quality sensors 14 utilized in the embodiment. As a first example, the resource quality sensors 14 may be fixed in a particular location with regard to a stationary natural resource 12 (e.g., a water sensor mounted in a wall of a reservoir containing a standing body of water), fixed in a particular location where a mobile natural resource 12 may be detected (e.g., a water sensor mounted in a bank of a river to detect water surges), transient (e.g., a water sensor mounted in a floating buoy, or a wildlife sensor fixed to a mobile animal), or mobile (e.g., a robot positioned within a nature preserve and controlled, either autonomously or by a human operator, to move to and monitor different locations within the nature preserve, such as to track moving wildlife).

As a second example of this second aspect, the natural resource quality sensors 14 may be operated centrally, e.g., may be wholly controlled by computers in a processing system, or may be distributed, e.g., with a degree of autonomous operation. In some scenarios, the natural resource quality sensors 14 may include sensors in a supervisory control and data acquisition (SCADA) system, such as a distributed industrial control process comprising a set of remotely deployed sensors that detect and control various properties of an expansive natural resource 12 or natural resource processing system and report the natural resource quality indicators 16 to a centralized monitoring station. In some such scenarios, SCADA systems may already deploy and utilize such sensors, and the data generated thereby may be included or transformed for inclusion in the reporting systems discussed in the present disclosure. Alternatively or additionally, the natural resource quality sensors 14 may comprise standalone sensors that feature only sensing capabilities, or may include one or more control elements that actively or passively affect the natural resource 12. As still another variation, multiple natural resource quality sensors 14 may be configured to detect and report natural resource quality indicators 16 of a natural resource 12 redundantly, e.g., in case a natural resource quality sensor 14 fails or exhibits inaccuracies in the detection or reporting of natural resource quality indicators 16.

As a third example of this second aspect, a natural resource quality sensor 14 may be configured to detect and report natural resource quality indicators 16 of the natural resource autonomously (e.g., at a particular period, such as once per day, or upon detecting various conditions of the natural resource 12, such as a river flow sensor configured to detect and report surges in the flow rate of the river), and/or may be configured to report natural resource quality indicators 16 upon request of other systems, natural resource servers 18, and/or users 20 (e.g., a sensor may accept a request to detect a particular natural resource quality indicator type, and upon receiving such a request, may detect and report to a natural resource server 18 the requested types of natural resource quality indicators 16 for the natural resource 12). Additionally, natural resource quality sensors 14 may include mechanisms for reporting the location of the detected natural resource quality indicators 16 (e.g., the location of the natural resource quality sensor 14 and/or the natural resource 12 at the time of collecting the natural resource quality indicator 16), such as a Global Positioning System (GPS) receiver or a beacon triangulation system. Such natural resource quality sensors 14 may therefore include with one or more natural resource quality indicators 16 a geocode, such as a latitude/longitude pair, that indicates the location where the natural resource quality indicator 16 was collected.

As a fourth example of this second aspect, natural resource quality sensors 14 may comprise collections of various types of components that promote the functionality of the sensor. As a first variation, a natural resource quality sensor 14 may be powered by a battery, a power receiving system connected to an energy source, or a power generation component such as a solar panel, wind turbine, or water wheel. As a second variation, the natural resource quality sensor 14 may include various types of sensing components, such as thermometers, barometers, manometers, mass scales, chemical or biological measuring components, and cameras that feed images to various image processing algorithms that are configured to quantify various natural resource quality indicators 16 visualized by the cameras. As a third variation, the natural resource quality sensor 14 may promptly report the natural resource quality indicators 16 to a natural resource server 18 upon detection, may temporarily store such natural resource quality indicators 16 in a buffer, or may store such natural resource quality indicators 16 in a volatile or non-volatile memory for transmission to a natural resource server 18 in a batch. As a fourth variation, a natural resource quality sensor 14 may include various components for transmitting natural resource quality indicators 16 to a natural resource server 18 via various communication channels, such as a wide area computer network (e.g., the internet or a radio or cellular communication network channel), a local area computer network channel (e.g., a WiFi network connecting a set of devices), or a personal area network channel (e.g., a Bluetooth network, a radiofrequency identification device (RFID) network, or an infrared communication channel). Those of ordinary skill in the art may select among many designs and components for inclusion in the natural resource quality sensors 14 included in embodiments of the techniques presented herein.

A third aspect that may vary among embodiments of these techniques relates to the configuration and features of the natural resource server 18. As a first example, an embodiment of these techniques may feature a single natural resource server 18, a set of natural resource servers 18 exposed as a single access point and operating in a cooperative manner (e.g., a server farm), a set of loosely coupled natural resource servers 18 that provide independent access points to the natural resource quality indicators 16 but that interoperate (e.g., a set of globally interconnected, distributed servers that share data), or a set of independently operating natural resource servers 18 (e.g., a set of natural resource servers 18 that independently receive and store natural resource quality indicators 16 and generate reports 24 at the request of users 20). A set of natural resource servers 18 may also be organized as peers (e.g., with each server having an equivalent set of capabilities to other servers, and configured to request and receive data from other servers in a similar manner) or as a hierarchy (e.g., some natural resource servers 18 having a superior relationship with one or more subordinate natural resource servers 18, e.g., a canonical natural resource server 18 that serves as an authoritative source of natural resource quality indicators 16 and a mirror natural resource server 18 that provides auxiliary access to the same information). Alternatively or additionally, multiple natural resource servers 18 may be configured to receive natural resource quality indicators 16 and generate reports 24 redundantly; e.g., if a natural resource server 18 fails or becomes unavailable, other natural resource servers 18 may be available to provide access to the same natural resource quality indicators 16 for the same natural resources 12. As a second variation of this first example, a natural resource server 18 may be assigned to receive natural resource quality indicators 16 from a particular set of one or more natural resource quality sensors 14, or to receive natural resource quality indicators 16 from any natural resource quality sensor 14 included in an embodiment of these techniques.

As a second example of this third aspect, the natural resource servers 18 included in an embodiment of these techniques may include various components that provide various features. In a first such variation, an embodiment of a natural resource server may comprise a hardware device, such as a dedicated server, that is configured for exclusive service as a natural resource server. Alternatively, the natural resource server 18 may be implemented as a software architecture, such as a set of instructions comprising one or more software components that, when stored in a memory of the device and executed on a processor of the device, interoperate to cause the device to operate as a natural resource server 18. In a second such variation, the natural resource server 18 may communicate with natural resource quality sensors 14 and/or users 20 via various communication channels, such as a wide area network (e.g., the internet or a radio or cellular communication network channel), a local area network channel (e.g., a WiFi network connecting a set of devices), or a personal area network channel (e.g., a Bluetooth network, a radiofrequency identification device (RFID) network, or an infrared communication channel). In a third such variation, the natural resource server 18 may store received natural resource quality indicators 14 in various memory components, such as system memory, a hard disk drive, a solid-state storage device, or a magnetic or optical disc. In a fourth such variation, the natural resource quality indicators 14 may be stored in many ways, e.g., as records in a database, as files in a file system, or as objects in an object system.

As a third example of this third aspect, one or more natural resource servers 18 may be configured to communicate with one or more natural resource quality sensors 14 in various ways. As a first variation of this third example, natural resource server 18 may also be configured to, in addition to receiving natural resource quality indicators 16 from a natural resource quality sensor 14, send commands to the natural resource quality sensor 14 relating to the capabilities thereof. For example, a sensor in a SCADA system comprising a water treatment facility may send water quality indicators to a centralized monitoring server, and in reply, the server may send commands to the water quality sensor to adjust various properties of the components of the water treatment facility, such as flow control systems or chemical treatment components. Alternatively or additionally, a natural resource server 18 may be configured to accept natural resource quality indicators 16 only after authenticating the natural resource quality sensor 14 wherefrom such indicators are transmitted. For example, a natural resource server 18 may be configured to store at least one sensor authentication credential associated with at least one natural resource quality sensor 14 (e.g., a cryptographic public key corresponding to a cryptographic private key stored by the natural resource quality sensor 14 and used to sign natural resource quality indicators 16 generated therefrom), and the natural resource quality sensor 14 may be configured to transmit the natural resource quality indicator 16 to the natural resource server 18 with at least one submitted sensor authentication credential (e.g., a cryptographic signature of the natural resource quality indicator 16). Accordingly, the natural resource server 18 may be configured to, upon receiving a natural resource quality indicator 16, verify the submitted sensor authentication credential using the sensor authentication credential associated with the natural resource quality sensor 14, and store the natural resource quality indicator 16 only after verifying the submitted sensor authentication credential. This variation may reduce the reporting of natural resource quality indicators 16 by untrusted sensors or malicious users, as well as the forging of natural resource quality indicators 16 to appear to issue from a trusted natural resource quality sensor 14 or trusted operator thereof. As a second variation of this third example, one or more natural resource quality sensors 14 may be configured to report encrypted natural resource quality indicators 16 to the natural resource server 18 (e.g., encrypted using a cryptographic public key of the natural resource server 18), and the natural resource server 18 may be configured to, upon receiving an encrypted natural resource quality indicator 16, decrypt the encrypted natural resource quality indicator 16 (e.g., using a corresponding cryptographic private key of the natural resource server 18). This variation may be advantageous, e.g., for reducing by malicious users 20 the incidence of eavesdropping or alteration of the natural resource quality indicators 16 submitted by a trusted natural resource quality sensor 14.

As a third variation of this third example, the natural resource server 18 may comprise authentication credentials that are provided to a natural resource quality sensor 14, and that are verified by the natural resource quality sensor 14, e.g., before sending a natural resource quality indicator 16 thereto and/or accepting a command therefrom. Alternatively or additionally, the natural resource server 18 may send encrypted commands to the natural resource quality sensors 14, which may be configured to decrypt the encrypted commands before execution. These variations may be advantageous, e.g., for reducing communication with a natural resource quality sensor 14 from an untrusted server masquerading as a natural resource server 18, e.g., in order to send malicious commands to the sensor.

As a fourth example of this third aspect, a natural resource server 18 may send natural resource quality reports 24 to users 20 in many different ways. As a first variation, the natural resource server 18 may await a report request 22 generated by a user 20, and upon receiving such a report request 22 (e.g., a uniform resource locator (URL) request sent to the natural resource server 18 configured as a web server), may generate the natural resource quality report 24 and deliver it to the user 20. As a first alternative, the natural resource quality report 24 may be pregenerated (e.g., for a particular period, a particular natural resource 12, or a particular user 20) and stored, and may be provided upon request of the user 20 (e.g., the receipt of a uniform resource identifier (URI) request specifying a particular period, natural resource, or user in a RESTful access model). As a second alternative, a natural resource quality report 24 may be sent to a user 20 spontaneously, e.g., as an alert of a condition of a natural resource 12 that may be relevant to a user 20. Various users 20 may be selected for notifications (e.g., an identification of users 20 proximately located with respect to a natural resource 12 for which alerts have been created), or may specifically request to be notified of various alerts, perhaps being permitted to generate a custom alert based on user-specified alert criteria. For example, the natural resource server 18 may be configured to store at least one alert comprising at least one alert criterion associated with at least one natural resource 12 (e.g., a conditional trigger that, when detected, raises the alert), at least one user contact associated with at least one user 20 (e.g., an email address or a Simple Message Service (SMS)-compatible mobile phone number). Upon detecting the at least one alert criterion of an alert, the natural resource server 18 may notify the user 20 of the alert using the stored user contacts. As one such scenario, the natural resource server 18 may store the email addresses of a set of users 20 identified a residents of an area who may utilize a body of water for drinking, cooking, and hygiene. Upon receiving natural resource quality indicators 16 indicating a rising level of a biological or chemical contaminant, a change in state (e.g., a freezing of the body of water), or a reduced availability (e.g., low volume due to drought conditions), the natural resource server 18 may send an email messages to the users 20 to notify them of the change in the condition of the water supply.

As a second variation of this fourth example of this third aspect, the natural resource server 18 may be configured to respond to a report request 22 received from a user 20 by authenticating the user 20. For example, a natural resource server 18 may be configured to store at least one user authentication credential associated with at least one user 20 (e.g., a username and password combination). Such authentication credentials may be stored, e.g., as part of a user profile of the user 20 that also includes various information about the user 20 that may be utilized to generate a relevant natural resource quality report 24 (e.g., a location associated with the user 20 or the interests of the user 20 that may be helpful in identifying which natural resources 12 to include in the report). When the natural resource server 18 receives a report request 22 from a user 20, the natural resource server 18 may solicit the user authentication credentials from the user 20 (e.g., by presenting a login web page), and upon receiving such credentials, may verify the submitted user authentication credentials with the user authentication credential stored for the user 20, and may send the natural resource quality report 24 to the user 20 only after verifying the submitted user authentication credentials. In this manner, the natural resource server 18 may provide natural resource quality reports 24 to a particular set of users 20, and may tailor such reports for the details of the user 20. This authentication technique may also be useful, e.g., for creating a sponsorship model to offset some of the infrastructure costs of the embodiment; e.g., a user 20 of the embodiment may be permitted to create a paid-for user account, and the natural resource server 18 may restrict the provision of natural resource quality reports 24 or the provision of alerts only to users 20 having a paid-for user account. Members of the public may be invited to create a paid-for user account, but may also be provided a more limited (e.g., less detailed) version of a natural resource quality report 24.

As a fifth example of this third aspect, many types of content may be selected for inclusion in a natural resource quality report 24 generated by a natural resource server 18. As a first variation, the natural resource quality report 24 may be formatted in various ways for various uses by humans and automated processes. Some natural resource quality report types that may be useful in some scenarios include a print-ready document (e.g., a Portable Document Format (PDF) file); a media document, such as a sound, diagram, or video; a human-readable message, such as an email message or a Simple Messaging Service (SMS) message; a human-readable web page; a map of a location comprising at least one natural resource 12; an image representing at least one natural resource 12; or a process-readable data representation of at least one natural resource quality indicator 16, such as an Extensible Markup Language (XML) document comprising a hierarchically structured data set that specifies the natural resource quality indicators 16 in a declarative manner. The content may also include, e.g., one or more advertisements by advertisers (such as commercial entities selling units of a natural resource for a particular price), and the advertising revenue from such advertisements may be used to offset the infrastructure costs of the natural resource servers 18 and/or the natural resource quality sensors 14.

As a second variation of this fifth example of this third aspect, a natural resource server 18 may store natural resource quality indicators 16 for a large and possibly diverse set of natural resources 12, and may select among such natural resources 12 and natural resource quality indicators 16 for inclusion in a natural resource quality report 24 generated for a particular user 20 in many ways. For example, the natural resource server 18 may include in the natural resource quality report 24 for only one or more particular types of natural resources 12 that are of interest to the user 20 (e.g., only bodies of water), and/or only one or more particular types of natural resource quality indicators 16 (e.g., only indicators relating to contaminants of a body of water). Alternatively or additionally, the natural resource server 18 may, from among the set of natural resources 12 represented by natural resource quality indicators 16 stored by the natural resource server 18, select those that are pertinent to the user 20. For example, the natural resource server 18 may receive with a report request 22 a geocode that indicates the location associated with the user 20 (e.g., a latitude/longitude combination, or an address or zip code of the user 20), which may be entered manually by the user 20 (e.g., by selecting the location on a map), detected by a device of the user 20 (e.g., a Global Positioning System (GPS) receiver), or inferred by the natural resource server 18 (e.g., by geolocating the user 20 based on the internet protocol (IP) address at which the user is available). The natural resource server 18 may then generate a natural resource quality report 24 relating to the natural resources 12 located near the location associated with the user 20 according to the geocode. This type of natural resource quality report 24 may be represented, e.g., as a graphical map indicating the detected location associated with the user 20 and (using text, color coding, descriptive icon, etc.) the presence, availability, and quality of various natural resources 12 located near the user 20 or in an area selected by the user 20 as an area of interest.

As a third variation of this fifth example of this third aspect, the natural resource server 18 may include in the natural resource quality report 24 various representations of time. In one such variation, the natural resource server 18 may indicate the age of the natural resource quality report 24 and/or the amount of time involved in generating the natural resource quality report 24 by detecting a report time indicator relating to a report generation time compared with a report request time of the report request 22 of the user 20. This variation may be advantageous, e.g., if natural resource quality reports 24 are pregenerated or if the generation thereof may be lengthy, such that the age of the report may be relevant in assessing the freshness and reliability of the natural resource quality indicators 16 reported therein. In a second such variation, the ages of the natural resource quality indicators 16 may be included in the natural resource quality report 24. For example, at least one natural resource quality indicator 16 may comprise a natural resource quality indicator time, such as the date and time of capturing the natural resource quality indicator 16; and the natural resource server 18 may be configured to detect a natural resource quality indicator age relating to a report generation time compared with the natural resource quality indicator time (e.g., "this quality indicator was collected six days before the date of this report"). This information may be advantageous, e.g., for assessing the freshness of the natural resource quality indicators 16 included in the natural resource quality report 24, particularly where such indicators are not promptly collected and/or represent ephemeral or volatile properties of the natural resource 12. Alternatively or additionally, one or more natural resource quality sensors 14 may be configured to detect a location of the natural resource 12 (e.g., using a global positioning service (GPS) receiver), and to include in the natural resource quality indicator 16 a geocode indicating the location of the natural resource 12 and/or the natural resource quality sensor 14 at the time of detecting the natural resource quality indicator 16. Additionally, a natural resource server 18 may be configured to store the geocode associated with the natural resource quality indicator 16. This metadata concerning the natural resource quality indicator 16 may be useful, e.g., in generating a report of natural resources located near a user 20.

As a sixth example of this third aspect, one or more natural resource servers 18 may be configured to accept, evaluate, and apply one or more automated software processes configured to operate on the natural resource quality indicators 16 associated with various natural resources 12. In accordance with various software agent and/or mobile code techniques, a user 20 may devise a software process (a "agent") that may perform various types of evaluation of a set of natural resource quality indicators 16, and the user 20 may provide the software process to a natural resource server 18 for execution. As a first such example, a complex statistical evaluation of a large set of natural resource quality indicators 16 may be devised as a software process configured to execute on a natural resource server 18 and generate output that may be stored on the natural resource server 18. As a second such example, a agent may be configured to accept detected natural resource quality indicators 16 from a first natural resource server 18 and to reported one or more reported natural resource quality indicators 16 based on the detected natural resource quality indicators (e.g., data or conclusions derived from the detected natural resource quality indicators 16) to a second natural resource server 18. As a third such example, a agent may comprise a natural resource quality indicator database of natural resource quality indicators 16 collected from one or more natural resource servers 18 (e.g., historic natural resource quality indicators reported by a natural resource server 18 over time), and may perform comparisons involving the collected set of natural resource quality indicators 16 of a natural resource 12 (e.g., comparisons of currently detected natural resource quality indicators 16 with historic natural resource quality indicators to generate one or more natural resource quality change indicators that may illustrate trends in the quality of the natural resource 12 over time). Such comparisons may result in the delivery of data to a natural resource server 18 for reporting, and/or to the user 20 who devised the agent.

These examples present some techniques for configuring a natural resource server 18 included in an embodiment of the techniques presented herein, and some of the features and advantages that may be achieved thereby. However, those of ordinary skill in the art may devise many configurations of natural resource servers 18 in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 4:
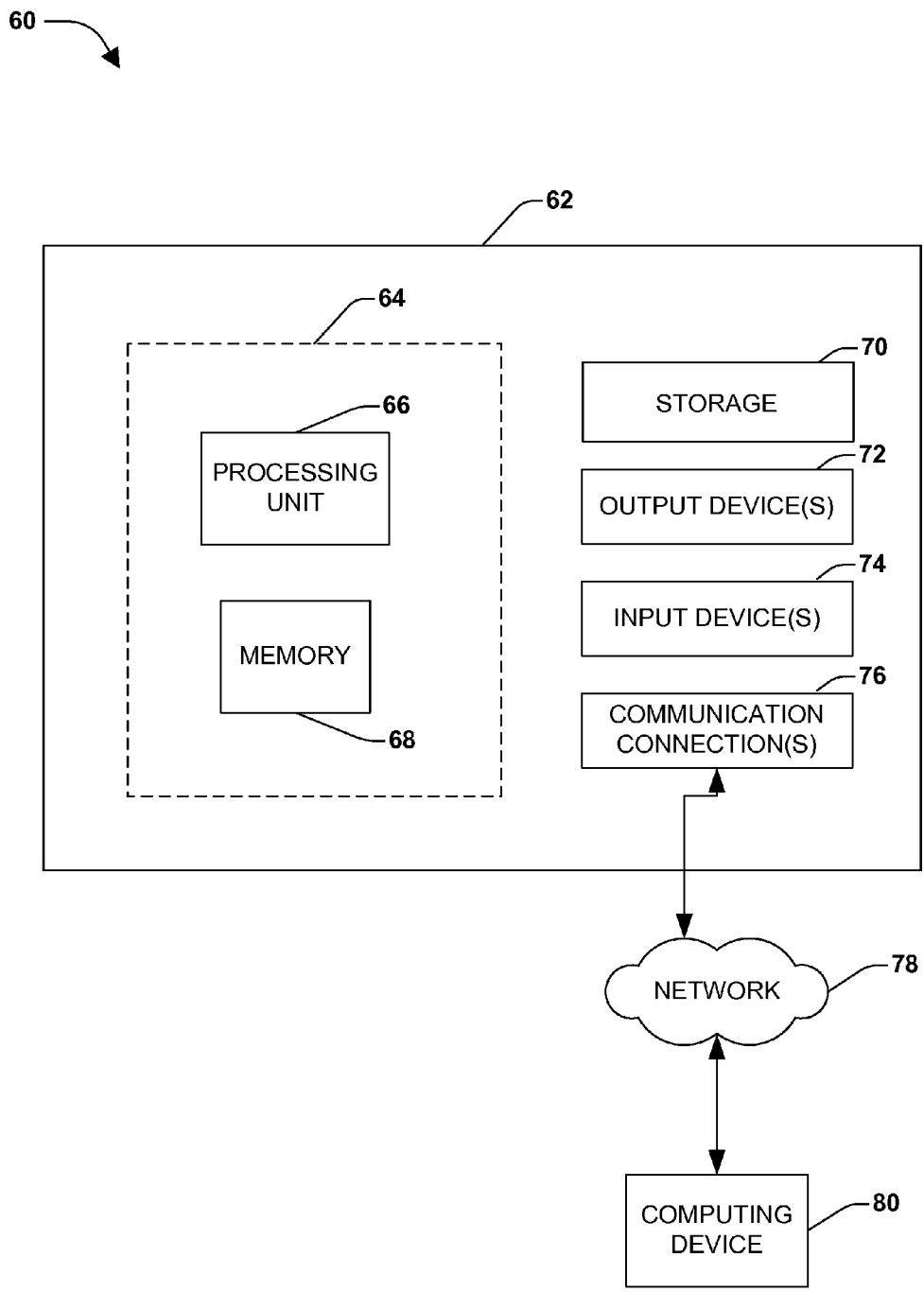
FIG. 4 illustrates an exemplary computing environment wherein one or more of the provisions set forth herein may be implemented.

FIG. 4 and the following discussion provide a brief, general description of a suitable computing environment to implement embodiments of one or more of the provisions set forth herein. The operating environment of FIG. 4 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, process control, automation and embedded computers, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 4 illustrates an example of a system 60 comprising a computing device 62 configured to implement one or more embodiments provided herein. In one configuration, computing device 62 includes at least one processing unit 66 and memory 68. Depending on the exact configuration and type of computing device, memory 68 may be volatile (such as RAM, for example), non-volatile (such as ROM, flash memory, etc., for example) or some combination of the two. This configuration is illustrated in FIG. 4 by dashed line 64.

In other embodiments, device 62 may include additional features and/or functionality. For example, device 62 may also include additional mass memory storage (e.g., removable and/or non-removable) including, but not limited to, magnetic storage, optical storage, and the like. Such additional storage is illustrated in FIG. 4 by storage 70. In one embodiment, computer readable instructions to implement one or more embodiments provided herein may be in storage 70. Storage 70 may also store other computer readable instructions to implement an operating system, an application program, and the like. Computer readable instructions may be loaded in memory 68 for execution by processing unit 66, for example.

The term "computer readable media" as used herein includes computer storage media. Computer storage media includes volatile and nonvolatile, removable and non-removable, rewritable and non-rewritable media implemented in any method or technology for storage of information such as computer readable instructions or other data. Memory 68 and storage 70 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 62. Any such computer storage media may be part of device 62.

Device 62 may also include communication connection(s) 76 that allows device 62 to communicate with other devices. Communication connection(s) 76 may include, but is not limited to, a modem, a Network Interface Card (NIC), an integrated network interface, a radio frequency transmitter/receiver, an infrared port, a USB connection, or other interfaces for connecting computing device 62 to other devices. Communication connection(s) 76 may include a wired connection or a wireless connection. Communication connection(s) 76 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 62 may include input device(s) 74 such as keyboard, mouse, pen, voice input device, touch input device, infrared cameras, video input devices, Global Positioning System (GPS) receivers, and/or any other input device. Output device(s) 72 such as one or more displays, speakers, printers, and/or any other output device may also be included in device 62. Input device(s) 74 and output device(s) 72 may be connected to device 62 via a wired connection, wireless connection, or any combination thereof. In one embodiment, an input device or an output device from another computing device may be used as input device(s) 74 or output device(s) 72 for computing device 62. Alternatively or additionally, the input device(s) 74 and output device(s) 72 may communicate with each other and/or with other devices through the transmission and/or receipt of various digital and/or analog signals.

Components of computing device 62 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. Such interconnects may also be configured to communicate in serial and/or parallel manner; may be synchronous or asynchronous; etc. In another embodiment, components of computing device 62 may be interconnected by a network, which may transmit communications via electricity, magnetism, light, sound, pressure, or other mechanisms, and/or which may utilize various types of physical media, such as metal, fiber optics, or air. For example, memory 68 may be comprised of multiple physical memory units located in different physical locations interconnected by a network.

Those skilled in the art will realize that storage devices utilized to store computer readable instructions may be distributed across a network. For example, a computing device 40 accessible via network 78 may store computer readable instructions to implement one or more embodiments provided herein. Computing device 62 may access computing device 40 and download a part or all of the computer readable instructions for execution. Alternatively, computing device 62 may download pieces of the computer readable instructions, as needed, or some instructions may be executed at computing device 62 and some at computing device 40.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system configured to present to users natural resource quality indicators of respective natural resources, the system comprising:
   at least one natural resource server configured to:
      upon receiving a natural resource quality indicator, store the natural resource quality indicator, and
      upon receiving from a user a report request to report a natural resource quality of a natural resource:
         receive from the user a geocode indicating a user location of the user:
         generate a natural resource map representing a geographic region within a proximity range of the user and indicating:
            the user location of the user, and
            for respective at least one natural resource within the proximity range of the user:
               a natural resource location of the natural resource; and
               an icon representing at least one natural resource quality indicator of the natural resource; and
         send the natural resource map to the user.

2. The system of claim 1, at least one natural resource quality indicator of a natural resource selected from a natural resource quality indicators set comprising:
   a natural resource component indicator;
   a natural resource contaminant indicator;
   a natural resource concentration indicator;
   a natural resource age indicator;
   a natural resource location indicator;
   a natural resource source indicator;
   a natural resource physical dimension indicator;
   a natural resource temperature indicator;
   a natural resource quantity indicator;
   a natural resource price indicator;
   a natural resource consumer indicator; and
   a natural resource quality grade indicator.

3. The system of claim 1:
   at least one natural resource comprising a body of water; and
   at least one natural resource quality indicator of the body of water selected from a set of water quality indicators comprising:
      a water chemical component indicator;
      a water biological component indicator;
      a water physical component indicator;
      a water purity indicator;
      a water contaminant indicator;
      a water source indicator;
      a water volume indicator;
      a water flow rate indicator;
      a water flow direction indicator;
      a water temperature indicator; and
      a water quality grade indicator.

4. The system of claim 1:
   at least one natural resource quality sensor included in a natural resource processing system; and
   at least one natural resource quality indicator detected by the natural resource quality sensor relating to at least one processing component of the natural resource processing system.

5. The system of claim 1, at least one natural resource quality sensor comprising a SCADA system.

6. The system of claim 1, at least one natural resource quality sensor configured to report to at least one natural resource server at least one natural resource quality indicator comprising a geocode; and
   at least one natural resource server configured to, upon receiving the geocode with a natural resource quality indicator from a natural resource quality sensor, store the geocode associated with at least one natural resource quality indicator.

7. The system of claim 1, at least one natural resource quality sensor configured to communicate with at least one natural resource server via a communication channel selected from a communication channel set comprising:
   a wide area network channel;
   a local area network channel; and
   a personal area communication network channel.

8. The system of claim 1:
   the natural resource server configured to store at least one sensor authentication credential associated with at least one natural resource quality sensor;
   at least one natural resource quality sensor configured to transmit the natural resource quality indicator to the natural resource server with at least one submitted sensor authentication credential; and
   the natural resource server configured to, upon receiving a natural resource quality indicator:
      verify the submitted sensor authentication credential using the sensor authentication credential associated with the natural resource quality sensor, and
      upon verifying the submitted sensor authentication credential, store the natural resource quality indicator.

9. The system of claim 1:
   at least one natural resource quality sensor configured to report encrypted natural resource quality indicators to the natural resource server; and the natural resource server configured to, upon receiving an encrypted natural resource quality indicator, decrypt the encrypted natural resource quality indicator.

10. The system of claim 1:
the natural resource server configured to send at least one command to at least one natural resource quality sensor; and
the natural resource quality sensors configured to, upon receiving a command from a natural resource server, execute the command.

11. The system of claim 10:
at least one natural resource quality sensor configured to store at least one natural resource server authentication credential associated with at least one natural resource server;
the natural resource server configured to submit at least one submitted natural resource server authentication credential to the natural resource quality sensor before transmitting a command; and
the natural resource quality sensor configured to, upon receiving a command:
verify the submitted natural resource server authentication credential using the natural resource server authentication credential associated with the natural resource server, and
upon verifying the submitted natural resource server authentication credential, execute the command.

12. The system of claim 1:
the natural resource server configured to send encrypted commands to natural resource quality sensors; and
the natural resource quality sensors configured to, upon receiving an encrypted command, decrypt the encrypted command.

13. The system of claim 1, the natural resource server configured to communicate with at least one user via a communication channel selected from a communication channel set comprising:
a wide area network channel;
a local area network channel; and
a personal area computer network channel.

14. The system of claim 1:
the natural resource server configured to store at least one user authentication credential associated with at least one user; and
the natural resource server configured to, upon receiving from a user a report request to report a natural resource quality of a natural resource:
upon receiving from the user at least one submitted user authentication credential, verify the at least one submitted user authentication credential with the user authentication credential; and
upon verifying the submitted user authentication credential, send the natural resource map to the user.

15. The system of claim 1, the natural resource server configured to:
store at least one alert comprising:
at least one alert criterion associated with at least one natural resource, and
at least one user contact associated with at least one user; and
upon detecting the at least one alert criterion of at least one alert, notify the at least one user of the alert using the at least one user contact.

16. The system of claim 1, the natural resource further including information formatted according to a natural resource quality report type selected from a natural resource quality report type set comprising:

a print-ready document;
a media document;
a human-readable message;
a human-readable web page;
an image representing at least one natural resource; and
a process-readable data representation of at least one natural resource quality indicator.

17. The system of claim 1, the natural resource server configured to, upon receiving from a user a report request to report a natural resource quality of a natural resource:
receive a geocode indicating a second location specified by the user;
generate a second natural resource map comprising at least one natural resource quality indicator for at least one natural resource located within a proximity distance of the second location according to the geocode; and
send the second natural resource map to the user.

18. The system of claim 1, the natural resource server configured to:
detect a report time indicator relating to a report generation time compared with a report request time of the report request of the user; and
include the report time indicator in the natural resource map.

19. The system of claim 1:
at least one natural resource quality indicator comprising a natural resource quality indicator time; and
the natural resource server configured to:
detect a natural resource quality indicator age relating to a report generation time compared with the natural resource quality indicator time; and
include the report time indicator in the natural resource map.

20. The system of claim 1:
at least one natural resource quality sensor configured to:
detect a location of the natural resource, and
include in a natural resource quality indicator a geocode indicating the location of the natural resource; and
at least one natural resource server configured to store the geocode associated with the natural resource quality indicator.

21. The system of claim 1, comprising at least one agent configured to:
receive at least one detected natural resource quality indicator from a first natural resource server, and
report at least one reported natural resource quality indicator based on the at least one detected natural resource quality indicator to a second natural resource server.

22. The system of claim 20:
at least one agent comprising a natural resource quality indicator database configured to store at least one historic natural resource quality indicator of a natural resource; and
the at least one agent configured to:
upon receiving at least one detected natural resource quality indicator of a natural resource, compare the detected natural resource quality indicator of the natural resource to at least one historic natural resource quality indicator of the natural resource to generate at least one natural resource quality change indicator; and
transmit the at least one natural resource quality change indicator to the second natural resource server.

23. A method of presenting to users natural resource quality indicators of respective natural resources using a computer having a processor, the method comprising:
executing on the processor instructions configured to:

upon receiving a natural resource quality indicator from a natural resource quality sensor, store the natural resource quality indicator, and upon receiving from a user a report request to report a natural resource quality of a natural resource:

receive from the user a geocode representing a user location of the user:

generate a natural resource map representing a geographic region within a proximity range of the user and indicating:

the user location of the user, and for respective at least one natural resource within the proximity range of the user:

a natural resource location of the natural resource; and an icon representing at least one natural resource quality indicator of the natural resource, and send the natural resource map to the user.

24. A method of fulfilling requests of users for access to natural resources on a device having a processor and having access to a natural resource database, the method comprising:

executing on the processor instructions configured to:

upon receiving a natural resource quality indicator of a natural resource from a natural resource quality sensor, store the natural resource quality indicator of the natural resource in the natural resource database; and upon receiving from a user a request to access a natural resource, the request specifying a geocode representing a location of the user and a natural resource type of the natural resource requested by the user:

from the natural resource database, identify at least one selected natural resource of the natural resource type specified in the request and within a proximity range of the user location of the user represented by the geocode;

generate a natural resource map of a geographic region including the user location of the user, the natural resource map indicating:

the user location of the user; and for respective selected natural resources, an icon representing:

a natural resource location of the natural resource within the geographic region; and at least one natural resource quality indicator of the natural resource according to the natural resource database; and present the natural resource map to the user.

* * * * *